Oct. 4, 1966 W. T. FROST 3,277,244

MAGNETIC RECORDER-REPRODUCER

Filed July 17, 1962

INVENTOR
WILLIAM T. FROST

BY Robert W. Berray

ATTORNEY 3,277,244
Patented Oct. 4, 1966

3,277,244

MAGNETIC RECORDER-REPRODUCER

William T. Frost, Poughkeepsie, N.Y., assignor to International Business Machines Corporation, New York, N.Y., a corporation of New York Filed July 17, 1962, Ser. No. 210,399
3 Claims. (Cl. 179—100.2)

This invention relates to the art of magnetic recording and reproduction and more particularly to recording and reproducing apparatus utilizing inductive magnetic transfer techniques.

At a relatively early period in the development of recording on magnetic tape, the occurrence of undesirable induced images in layers of tape adjacent to a recorded layer was observed. In other words, it was observed that when magnetically recorded information was placed in contact with a neutral magnetic medium, the recorded information was in effect "printed" upon, or transferred to the neutral magnetic medium. It was then observed that the quality or strength of the printed information could be increased by the application of an external magnetic field. The external magnetic field had the effect of biasing the neutral magnetic medium to provide more favorable printing.

These observations suggested utilizing the printing phenomenon to duplicate magnetic records. A recorded master medium is placed in contact with a neutral slave and subjected to a magnetic "transfer" field. The field is controlled to promote efficient magnetic transfer without causing demagnetization of the master record. The prior art devices utilizing this technique have been confined to a transfer from a master magnetic medium to a slave magnetic medium wherein the master medium has had a higher coercivity than the slave magnetic medium. The difference in coercivity between the master and slave was required so that the magnetic transfer field which biases the slave does not have an adverse effect on the recorded information on the master tape. This necessarily meant that the magnetic transfer technique was confined to apparatus for transferring magnetic information from a high coercivity master medium to a lower coercivity slave medium.

It is a primary object of this invention to provide an apparatus allowing a magnetic transfer, or printing, to take place in either direction between two magnetic mediums.

Different mediums used in magnetic recording and reproduction exhibit greater or lesser amounts of wear when utilized with ordinary magnetic transducers. They can also effect greater or lesser amounts of wear upon ordinary magnetic transducers. At the same time, the form of the mediums may be such that in order to establish a required precise disposition with respect to a magnetic transducer, it is necessary to exert a relatively large force between the medium and the transducer thereby increasing the wear rate of the transducer and/or the medium. The magnetic transfer technique mentioned above suggests means whereby information can be recorded on and reproduced from a magnetic medium without its coming into frictional contact with magnetic transducers. Information could be pre-recorded by a transducer on a magnetic medium of a form such that a precise disposition between it and magnetic transducers persists. The recorded medium is then placed in contact with the magnetic medium required to contain the record and the information transferred magnetically onto the desired magnetic record medium. Reproduction of the magnetic information transferred to the record member would most usually be accomplished by another apparatus which would require the magnetic medium of the record member to be placed in positional register with an ordinary magnetic transducer thus presenting the problem of excessive wear of the magnetic medium and/or transducer. In a similar manner, information may be recorded in a normal way on the magnetic medium forming the record and reproduced by transferring the record onto another magnetic medium in register to which is the reproducing magnetic transducer. Again, the problem of excessive wear of the magnetic medium and/or transducer is presented, this time in the recording mode of operation. It is clear, therefore, that the usual operation of magnetic transfer techniques provides reproducing means only or recording means only.

It is a further object of this invention to provide a recording and reproducing apparatus utilizing the magnetic transfer technique.

It is another object of this invention to provide an apparatus for recording or reproducing magnetic information on a record member utilizing magnetic transfer techniques wherein the magnetic medium of the record member is not placed in contact with an ordinary magnetic transducer.

These and other objects are obtained in a preferred embodiment of the invention wherein a magnetizable record member is placed in contact and transported with a magnetizable transfer medium along a path including a portion of the transfer medium. A transducer is provided to register with the transfer medium for performing either direct magnetic recording on the transfer medium or reproduction of magnetic information from the transfer medium. Means are provided in cooperative relationship with the in-contact portion of the travel of the record member and the transfer medium for transferring magnetic information, previously recorded by the transducer on the transfer medium, from the transfer medium to the record member or for transferring magnetic information from the record member to the transfer medium for subsequent reproduction by the transducer.

The foregoing and other objects, features and advantages of the invention will be apparent from the following more particular description of preferred embodiments of the invention, as illustrated in the accompanying drawings.

Figure 1:
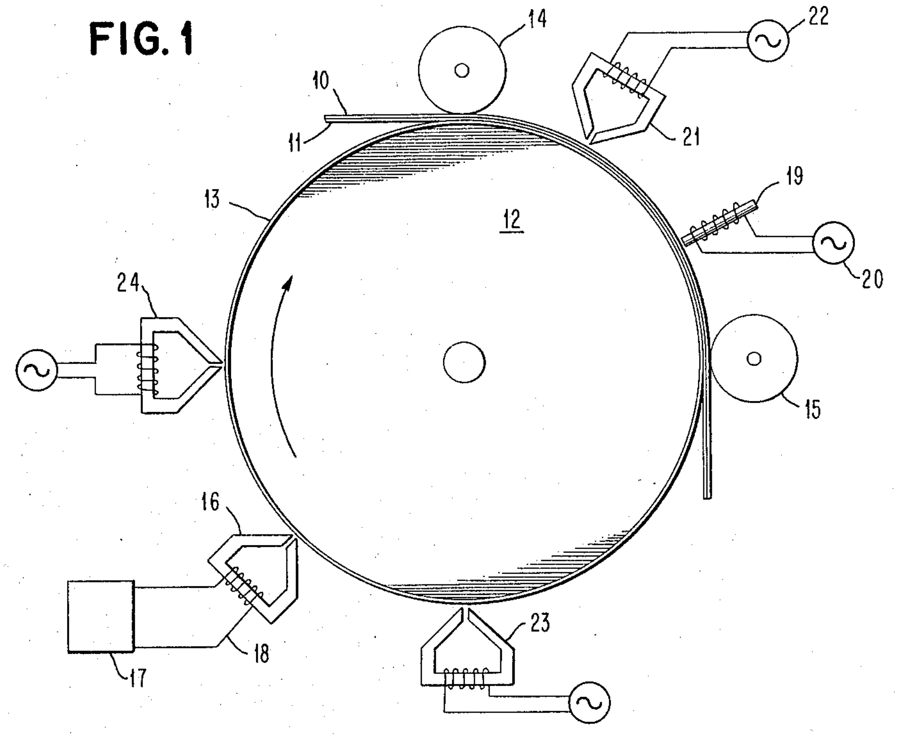
FIGURE 1 is a schematic representation of a preferred embodiment of the invention.

In FIGURE 1 there is shown a magnetic record 10 having a magnetizable surface 11 with physical properties such that it is desired not to place the surface in contact with magnetic transducer means. The magnetic record 10 can take the form of tape, unit record cards or sheets with magnetizable surfaces. A drum 12 is provided with suitable motive power for causing rotation in the direction shown by the arrow. The peripheral surface of the drum 12 is provided with a magnetizable surface 13. Suitable means, such as rollers 14 and 15 are provided for maintaining the record member 10 and drum 12 in intimate contact along a portion of the peripheral surface of the drum 12. The magnetizable surface 11 of the record member 10 and the magnetizable surface 13 of the drum 12 are thus placed in contact with each other along a path including a portion of the peripheral surface of the drum 12.

A suitable transducer 16 is placed in register with the magnetizable surface 13 of the drum 12 along another portion of the peripheral surface of the drum 12. Suitable switching and control means 17 are provided to the signal windings 18 of transducer 16 to accomplish direct magnetic recording of information on the magnetizable surface 13 or reproduction of information recorded on the surface 13. The drum 12 is used as a transfer medium between the record 10 and transducer 16.

Cooperatively positioned with respect to the in-contact portion of the path of travel of the record 10 and the drum 12 is a transducer 19. Transducer 19, with suitable energizing means 20 produces a flux field perpendicular to surfaces 11 and 13 operating to magnetically bias the magnetizable surface 11 of the record 10 for transfer of magnetic information from the magnetizable surface 13 to the magnetizable surface 11. This magnetic information will have been previously recorded on the magnetizable surface 13 by transducer 16.

Cooperatively positioned with respect to the in-contact portion of the path of travel of record 10 and drum 12 is another transducer 21. A suitable energization source 22 is provided for transducer 21 producing a magnetic flux field substantially parallel to surfaces 11 and 13 effective to transfer magnetic information from magnetizable surface 11 of record member 10 to the magnetizable surface 13 of drum 12. The information transferred from record 10 to drum 12 is then subsequently reproduced by transducer 16.

Suitable magnetic erasure means 23 and 24 are positioned on either side of transducer 16. Erasure means 23 will be rendered effective when the apparatus is being utilized to record magnetic information on the record member 10. Magnetic information transferred to the record member 10 is erased by means 23 prior to recording of new information by transducer 16. When the apparatus is utilized for reproducing information on the record member 10, erasure means 24 is rendered effective to erase magnetic information reproduced by transducer 16 prior to receiving new information from the record member 10.

Figure 2:
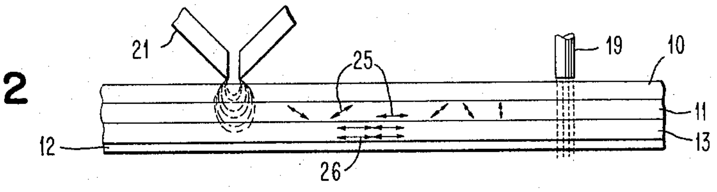
FIGURE 2 is a schematic representation of the principles involved in practicing the invention.

FIGURE 2 represents schematically the principles underlying the ability of the apparatus of FIGURE 1 to transfer magnetic information in either direction between the record member 10 and the drum 12. In the process of manufacture of magnetic mediums, it is possible to provide an orientation of the individual elements of the medium such that the magnetic medium can be made to exhibit different properties. It is possible to provide the individual elements with a random orientation such that magnetic information can be recorded equally as well by transducers which provide flux substantially parallel to the magnetizable surface or flux which is perpendicular to the magnetizable surface. It was also discovered that if the magnetic medium is manufactured such that the individual elements have an orientation in a predetermined direction, the ability to magnetically record information is changed dependent upon the direction of magnetic flux presented to the medium. The magnetic medium having predetermined orientation exhibits what has been described as a "hard" or "easy" direction of magnetization.

As mentioned in the introduction, prior art magnetic transfer techniques have been confined to transfer between magnetic mediums having different coercivity. Coercivity is generally defined as the ability of a magnetic medium to resist a change in magnetization. The prior art devices have provided master magnetic mediums having a higher coercivity than the slave magnetic medium. The reason for this is to allow a magnetic biasing field to be applied to the slave magnetic medium which has a strength sufficient to cause desired transfer from the master to the slave without having an adverse effect on the recorded information contained in the master magnetic medium.

In FIGURE 2, there is shown various components of FIGURE 1 designated with like numerals. In the preferred embodiment of the invention, the record number 10 has a magnetizable surface 11 provided with random orientation of the elements as depicted by the arrows 25. The magnetizable surface 13 of drum 12 is produced to provide an orientation of the magnetic elements having a predetermined direction, and shown in FIGURE 2 to be substantially parallel to the magnetizable surface 13 and represented by the arrows 26.

Transducer 19 is a probe type head which provides a magnetic biasing flux field substantially perpendicular to the magnetizable surfaces 11 and 13 and the individual elements 26 of the magnetizable surface 13. Transducer 21 is a ring type magnetic head which provides a magnetic biasing flux field between the pole shoes having a direction substantially parallel to the magnetizable surfaces 11 and 13 and the magnetizable elements 26. The coercivity of the magnetizable surfaces 11 and 13, with respect to the horizontal flux field produced by transducer 21, is such that the magnetizable surface 13 of drum 12 has a lower coercivity than the magnetizable surface 11 of the magnetic record 10. The strength of the flux field produced by the transducer 21 is controlled such that the magnetic bias provided is sufficient to cause transfer of magnetic information from the magnetizable surface 11 to the magnetizable surface 13 without destroying the information contained on the magnetizable surface 11. The flux produced by transducer 21 is in a direction corresponding to the "easy" direction of magnetization of elements 26. This is in accordance with well known magnetic transfer principles discussed in the introduction.

By providing one magnetizable surface with elements oriented in a predetermined direction and another magnetizable surface with elements oriented in a random fashion, transfer of magnetic information can take place from the magnetizable surface 13 of drum 12 to the magnetizable surface 11 of the record member 10. This is accomplished by the probe head 19. The "easy" direction of magnetization of elements 26 in magnetizable surface 13 is in a direction parallel to the flux produced by transducer 21. The "hard" direction of magnetization of elements 26 in surface 13, is a direction perpendicular to the element orientation. As a result, transducer 19 can produce a vertical magnetic biasing flux field having a strength sufficient to overcome the coercivity of the magnetizable surface 11 but which is not of a sufficient strength to overcome the "hard" direction of magnetization of the particles 26. Therefore magnetizable surface 11 with the randomly oriented elements can be biased sufficiently to cause transfer of magnetic information from magnetizable surfaces 13 to magnetizable surface 11 without destroying the information contained on surface 13.

When the apparatus of FIGURE 1 is used to record information on the record member 10, transducer 19 is energized to enable transfer from magnetizable surface 13 to magnetizable surface 11. Information to be recorded on the record 10 is directly recorded on the magnetizable surface 13 of drum 12 by transducer 16. Erasure means 23 is energized to prepare the drum 12 as a transfer medium prior to recording of information by transducer 16. The apparatus could be used to continuously record new information, record identical information, record identical information on several records, or intersperse new information with constant information through use of suitable switching means.

When the apparatus of FIGURE 1 is utilized to reproduce information previously recorded on a record member 10, transducer 21 and erasure means 24 are energized. Magnetic information on magnetizable surface 11 which is to be reproduced is transferred to the magnetizable surface 13 of drum 12 for subsequent reproduction by transducer 16. Erasure means 24 is effective to erase the information reproduced from surface 13 prior to the acceptance of transfer of information from surface 11 to surface 13 for subsequent reproduction.

Figure 3:
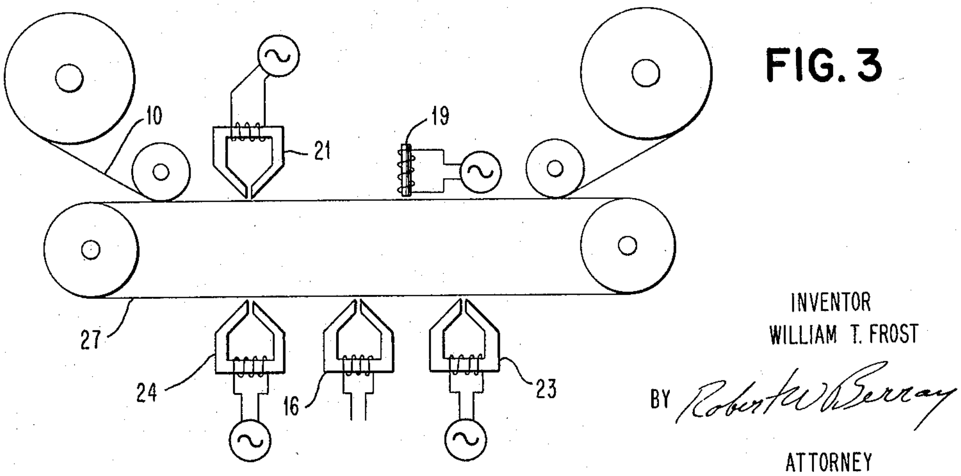
FIGURE 3 is a schematic representation of another embodiment of the present invention.

FIGURE 3 shows a modification of the invention wherein the transfer medium is changed to take the form of an endless magnetizable tape 27. The record member 10 is again transported in contact with a portion of the transfer medium 27 by suitable means. The same transducers are used, namely transducers 19 and 21, in cooperative relationship with the in-contact portion of the travel of the record member 10 and the transfer medium 27, recording and reproducing transducer 16, and erasure means 23 and 24 in cooperative relationship with another portion of the transfer medium 27.

There has thus been shown an apparatus for recording or reproducing magnetic information on a record medium utilizing magnetic printing or transfer techniques whereby the recording and reproduction can take place without requiring the magnetizable surface of the record member to be placed in intimate contact with transducing means likely to subject the magnetizable surface or the transducer to excessive wear. At the same time the operationally required precision of registration between record and transducers has been effected.

While the invention has been particularly shown and described with reference to preferred embodiments thereof, it will be understood by those skilled in the art that various changes in form and details may be made therein without departing from the spirit and scope of the invention.

What is claimed is:

1. Apparatus for recording or reproducing magnetic information on a record member having a surface of magnetizable elements with random orientation comprising:

an endless magnetizable transfer medium having a surface of magnetizable elements each oriented in a predetermined direction;

means for transporting the magnetic record member and said transfer medium in juxtaposed relationship along a path including a portion of said transfer medium;

transducer means, cooperatively positioned with another portion of said transfer medium for selectively recording or reproducing magnetic information on said transfer medium;

first transfer means, including biasing means for providing a flux field perpendicular to said predetermined direction, cooperatively positioned with respect to said transfer medium and the record member along said juxtaposed path for transferring magnetic information, previously recorded on said transfer medium by said transducer, to the record member;

and second transfer means, including biasing means for providing a flux field parallel to said predetermined direction cooperatively positioned with respect to said transfer medium and the record member along said juxtaposed path for transferring magnetic information, previously recorded on the record member, to said transfer medium for subsequent reproduction by said transducer means.

2. In a magnetic recorder-reproducer:

a magnetic record member;

magnetic transfer means;

said record member having a magnetizable surface with magnetizable elements having a random orientation;

said transfer means having a magnetizable surface with magnetizable elements having a predetermined orientation;

means for transporting said magnetic record member and said transfer means in juxtaposed relationship along a path including a portion of said transfer means;

a recording transducer, cooperatively positioned with another portion of said transfer means for recording magnetic information on said transfer means;

and biasing means for providing a flux field perpendicular to said predetermined direction cooperatively positioned with respect to said transfer means and said record member along said juxtaposed path for transferring magnetic information previously recorded on said transfer means by said transducer to said record member.

3. In a magnetic recorder-reproducer:

a magnetic record member;

magnetic transfer means;

said record member having a magnetizable surface with magnetizable elements having a random orientation;

said transfer means having a magnetizable surface with mgnetizable elements having a predetermined orientation;

means for transporting said magnetic record member and said transfer means in juxtaposed relationship along a path including a portion of said transfer means;

a reproducing transducer, cooperatively positioned with another portion of said transfer means for reproducing magnetic information on said transfer means;

and biasing means for producing a flux field parallel to said predetermined direction cooperatively positioned with respect to said transfer means and said record member along said juxtaposed path for transferring magnetic information, previously recorded on said record member, to said transfer means for subsequent reproduction by said transducer means.

References Cited by the Examiner

UNITED STATES PATENTS

| | | | |
|---|---|---|---|
| 2,768,049 | 10/1956 | Geiser | 179—100.2 |
| 2,890,288 | 6/1959 | Newman | 179—100.2 |
| 3,052,567 | 9/1962 | Gabor et al. | 179—100.2 |

BERNARD KONICK, *Primary Examiner.*

R. GOUDEAU, P. ROTH, *Assistant Examiners.*